United States Patent Office 2,873,288
Patented Feb. 10, 1959

2,873,288
PROCESS FOR THE PREPARATION OF VINYL TIN COMPOUNDS

Sanders D. Rosenberg, North Plainfield, and Ambrose J. Gibbons, Jr., East Brunswick Township, Middlesex County, N. J., assignors to Metal & Thermit Corporation, Rahway, N. J., a corporation of New Jersey No Drawing. Application September 18, 1956
Serial No. 610,664

9 Claims. (Cl. 260—429.7)

The present invention relates to a process for preparing vinyltin halides, and particularly to a process for preparing monovinyltin trihalides, divinyltin dihalides, and trivinyltin monohalides.

It is an object of the present invention to provide a simple and efficient process for the preparation of monovinyltin trihalides, divinyltin dihalides and trivinyltin monohalides.

Another object of the invention is to provide a process that yields substantially pure vinyltin halides.

Other objects will become apparent from the following description.

Generally speaking, the present invention contemplates the preparation of substantially pure vinyltin halides, having the formulas:

$$(CH_2=CH-)SnX_3,$$
$$(CH_2=CH-)_2SnX_2,$$

and $$(CH_2=CH-)_3SnX,$$

wherein X is chlorine or bromine, by a direct disproportionation reaction between tetravinyltin and the respective tin tetrahalide, in accordance with the following equations:

(1) $(CH_2=CH-)_4Sn + 3SnX_4 \rightarrow 4CH_2=CHSnX_3$
(2) $(CH_2=CH-)_4Sn + SnX_4 \rightarrow 2(CH_2=CH)_2SnX_2$
(3) $3(CH_2=CH-)_4Sn + SnX_4 \rightarrow 4(CH_2=CH)_3SnX$ The determining factor as to whether the tetravinyltin and tin tetrahalide will disproportionate in accordance with Equation 1, 2 or 3, is the respective amounts of reactants utilized. In all cases it has been found that the reactants disproportionate to yield the expected product.

The invention also contemplates the preparation of vinyltin halides by disproportionation between different vinyltin halides and tetravinyltin or tin tetrahalide, in accordance with the following equations:

(4) $-(CH_2=CH-)_3SnX + 2SnX_4 \rightarrow 3(CH_2=CH-)SnX_3$
(5) $-2(CH_2=CH-)_3SnX + SnX_4 \rightarrow$
$3(CH_2=CH-)_2SnX_2$
(6) $-(CH_2=CH-)_2SnX_2 + SnX_4 \rightarrow 2(CH_2=CH-)SnX_3$
(7) $-(CH_2=CH-)_2SnX_2 + (CH_2=CH)_4Sn \rightarrow$
$2(CH_2=CH)_3SnX$
(8) $-2(CH_2=CH-)SnX_3 + (CH_2=CH-)_4Sn \rightarrow$
$3(CH_2=CH-)_2SnX_2$
(9) $-CH_2=CH-SnX_3 + 2(CH_2=CH-)_4Sn \rightarrow$
$3(CH_2=CH-)_3SnX$
(10) $-CH_2=CH-SnX_3 + (CH_2=CH-)_3SnX \rightarrow$
$2(CH_2=CH-)_2SnX_2$ The preferred procedure for carrying out the disproportionation reaction comprises the slow addition of the stoichiometric amount of the tin tetrahalide to the stoichiometric amount of tetravinyltin. After completion of the addition, the reaction mixture is stirred for a period of time sufficient to attain equilibrium. This procedure has been carried out at temperatures varying from —10° C. to about 155–160° C. (the reflux temperature of the mixture). After equilibrium is attained, the reaction mixture is fractionally distilled, usually at reduced pressure, to yield the desired product. The mode of addition and of mixing the reactants is not critical and similar results will be attained by the slow addition of tetravinyltin to the tin tetrahalide, or merely by the batch addition of the two reactants, and then allowing sufficient time to come to equilibrium.

The yields attained by the present process are excellent, varying from about 80% to almost 100%. Of the three compounds desired, the vinyltin trihalide apparently is the most difficult to prepare. Whereas the addition of the stoichiometric amounts of reactants necessary to prepare the divinyltin dihalide and the trivinyltin monohalides will result in almost quantitative yields at temperatures between 0° C. and the reflux temperatures of the mixture, it has been found that the highest yields of the vinyltin trihalide are attained at higher temperatures preferably above 80° C., although a 59% yield has been obtained with a temperature between —5° C. and 18° C. It is preferred to utilize an excess of the tin halide reactant, usually about 10% excess.

The trivinyltin halides are the least stable of the vinyltin halides. It is preferred, in the preparation of derivatives of the trivinyltin halides, to prepare such derivatives from the reaction mixture resulting from the synthesis of the trivinyltin halides and then separating the various products. This procedure prevents possible disproportionation of the trivinyltin halides to the more stable compounds, especially the divinyltin dihalides and tetravinyltin, during the distillation of the trivinyltin halides from the reaction mixture.

The following examples are further illustrative of the present invention. It is to be understood, however, that the invention is not restricted to the specific embodiments described herein in detail.

Example 1.—Vinyltin trichloride

To 697 grams (2.9 moles) of trivinyltin chloride was slowly added 1820 grams (7 moles) of tin tetrachloride over a two hour period maintaining the temperature below 25° C. The reaction mixture was allowed to stand overnight and then distilled under reduced pressure. Vinyltin trichloride was obtained in 98% yield.

Example 2.—Vinyltin trichloride 1200 grams of tin tetrachloride was slowly added to 326 grams of tetravinyltin maintaining the mixture below 35° C. The solution was stirred for two hours and heated at 90° C. for two hours, and fractionally distilled under atmospheric pressure and then under reduced pressure for a 92% yield of vinyltin trichloride, analyzing 41.77% chlorine and 47.08% tin.

Example 3.—Divinyltin dichloride

In a 2.0 l. flask, was placed 340.5 g. (1.5 moles) of tetravinyltin. To this was added, over a 2.25 hours period, 390.8 g. (1.5 moles) of tin tetrachloride at a temperature of 30–35° C. The solution was then stirred for 2.0 hours and carefully fractionated under reduced pressure to yield: B. P. 45–60°/1.0–3.0 mm., 718 g. (98%) of divinyltin dichloride.

Analysis.—Calcd. for $C_4H_6Cl_2Sn$: Cl, 29.10; Sn, 48.71. Found: Cl, 28.76; Sn, 48.60. M. 13.2°; $n_D^{25}$ 1.541; $d_4^{25}$ 1.762.

Example 4.—Divinyltin dichloride 57.4 grams of tin tetrachloride was slowly added to 50 grams of tetravinyltin at —5° to +5° C. The reaction mixture was allowed to stand overnight and then fractionally distilled. The yield of divinyltin dichloride was 96%.

Example 5

Following the procedure of Example 3, 57.4 grams of tin tetrachloride was added to 50 grams of tetravinyltin during a one hour period while the temperature was maintained between 100 and 110° C. with agitation. It was then vacuum distilled to yield 92.50% of divinyltin dichloride.

Example 6

The procedure and amounts of Example 5 were utilized, except that the addition was made over a half hour period at temperatures of 155° to 170° C. The yield of divinyltin dichloride was 88%.

Example 7

In a 2.0 l. flask was placed 600 g. (2.64) of tetravinyltin. To this was added, over a 1.0 hr. period, 229 g. (0.88 mole) of tin tetrachloride at a temperature of 30–35°. The solution was stirred for 2.0 hr. and was fractionally distilled through a 3 ft. column under reduced pressure to yield 795 g. (96%) of trivinyltin chloride distilling at 68–73°/9.0 mm. (the major portion distilled at 70°/9.0 mm.)

*Analysis.*—Calcd. for $C_6H_9ClSn$: Cl, 15.07; Sn, 50.45. Found: Cl, 14.68; Sn, 50.14.

Example 8.—Trivinyltin chloride 184 grams of tin tetrachloride was slowly added to 481 grams of tetravinyltin over the period of one and three quarter hours, maintaining the temperature between −5° and +5° C. The reaction mixture was allowed to stand overnight and then fractionally distilled. Crude trivinyltin chloride analyzing 50.16% tin and 14.93% chlorine was obtained in 95% yield.

When tin tetrabromide or the vinyltin bromides are used instead of tin tetrachloride or the corresponding vinyltin chlorides in the process of this invention, the equivalent vinyltin bromides are prepared.

The compounds prepared by the process of this invention are useful as stabilizer intermediates for plastic resins; as biocidal materials functioning as fungicides, slimicides, nematocides, etc.; material (wood, leather, etc.) preservatives; as additives to rubber compounds; as additives to petroleum oils; and as components of veterinary compositions effective in the control of infections of fowl and domesticated animals. In addition, these materials may be used to prepare polymers. Some are polyfunctional and are active cross-linking agents. They function as copolymers and copolymerize with such compounds as styrene, vinyl acetate, vinyl chloride, butadiene, acrylate esters, etc. In addition, they are very valuable as chemical intermediates in preparing numerous vinyltin derivatives.

While the invention has been described with particular reference to specific embodiments, it is to be understood that it is not limited thereto but is to be construed broadly and restricted solely by the scope of the appended claims.

What is claimed is:

1. The process of preparing monovinyltin trihalides, divinyltin dihalides, and trivinyltin monohalides by a disproportionation reaction comprising mixing stoichiometric amounts of a halide selected from the class consisting of tin tetrahalide, divinyltin dihalide and vinyltin trihalide, with a vinyltin compound selected from the class consisting of tetravinyltin, divinyltin dihalide, and trivinyltin monohalide, said halide being selected from the class consisting of chlorides and bromides to yield the stoichiometrically determined vinyltin halide, wherein when said halide is a vinyl trihalide, said vinyltin compound is selected from the class consisting of tetravinyltin and trivinyltin monohalide, and wherein when said halide is a divinyltin dihalide, said vinyltin compound is tetravinyltin.

2. The process as described in claim 1 in which the halide is chlorine.

3. The process of preparing monovinyltin trihalides, divinyltin dihalides, and trivinyltin monohalides by a disproportionation reaction comprising mixing stoichiometric amounts of a tin tetrahalide with tetravinyltin, said halide being selected from the class consisting of chlorides and bromides, to yield the stoichiometrically determined vinyltin halide.

4. The process described in claim 3 in which the halide is chlorine.

5. The process of preparing vinyltin trichloride comprising reacting tetravinyltin with tin tetrachloride in the molar ratio of 1:3 to yield vinyltin trichloride.

6. The process of preparing divinyltin dichloride comprising reacting tetravinyltin with tin tetrachloride in the molar ratio of 1:1 to yield divinyltin dichloride.

7. The process of preparing trivinyltin chloride comprising reacting tetravinyltin with tin tetrachloride in the molar ratio of 3:1 to yield trivinyltin chloride.

8. The process as described in claim 5 in which the reaction is maintained between a temperature of about 80° C. and about 160° C.

9. The process of preparing vinyltin trichloride comprising reacting trivinyltin chloride with tin tetrachloride in the molar ratio of 1:2 to yield vinyltin trichloride.

References Cited in the file of this patent

Kozeschkow: Berichte 66, 1661–1665 (1933).
Borisov et al.: Izvest. Akad. Nauk S. S. S. R. Otdel. Khim. Nauk 1946, 647–50 (reported in C. A. 42, 6316[b] (1948)).

UNITED STATES PATENT OFFICE

CERTIFICATE OF CORRECTION

Patent No. 2,873,288                          February 10, 1959

Sanders D. Rosenberg et al

It is hereby certified that error appears in the printed specification of the above numbered patent requiring correction and that the said Letters Patent should read as corrected below.

Column 4, line 17, should read as shown below instead of as in the patent:

— said halide is a vinyltin trihalide, said vinyltin compound is —.

Signed and sealed this 8th day of September 1959.

(SEAL)
Attest:

KARL H. AXLINE
Attesting Officer

ROBERT C. WATSON
Commissioner of Patents